United States Patent
Kashihara et al.

(10) Patent No.: US 6,567,587 B2
(45) Date of Patent: May 20, 2003

(54) DISPERSION COMPENSATOR AND DISPERSION-COMPENSATING MODULE EMPLOYING THE SAME

(75) Inventors: Kazuhisa Kashihara, Tokyo (JP); Kazutaka Nara, Tokyo (JP); Kanji Tanaka, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 90 days.

(21) Appl. No.: 09/818,592

(22) Filed: Mar. 28, 2001

(65) Prior Publication Data

US 2001/0028762 A1 Oct. 11, 2001

(30) Foreign Application Priority Data

Mar. 29, 2000 (JP) .......................... 2000-091291

(51) Int. Cl.[7] .............................. G02B 6/00; G02B 6/36; G02B 6/44

(52) U.S. Cl. ....................................... 385/37

(58) Field of Search ............................... 385/24, 37, 42, 385/43, 46, 47, 48, 50, 96, 144, 9, 141, 134; 359/341, 134, 160, 179, 161, 124, 127, 122, 177; 65/406, 378, 399, 435, 385, 400, 408, 411, 425; 264/1.25, 1.26

(56) References Cited

U.S. PATENT DOCUMENTS

| | | | | |
|---|---|---|---|---|
| 5,805,751 A | * | 9/1998 | Kewitsch et al. | ............. 385/37 |
| 6,151,157 A | * | 11/2000 | Ball et al. | ................... 359/134 |
| 6,163,393 A | * | 12/2000 | Wu et al. | .................... 359/122 |
| 6,208,444 B1 | * | 3/2001 | Wong et al. | ................. 359/122 |
| 6,289,699 B1 | * | 9/2001 | Kewitsch et al. | .......... 264/1.25 |
| 6,377,375 B1 | * | 4/2002 | Taga et al. | ................... 359/127 |
| 6,421,478 B1 | * | 7/2002 | Paiam | .......................... 385/24 |

* cited by examiner

*Primary Examiner*—Akm E. Ullah
(74) *Attorney, Agent, or Firm*—Oblon, Spivak, McClelland, Maier & Neustadt, P.C.

(57) ABSTRACT

A dispersion compensator with Bragg gratings which have a dispersion compensating function and are formed on output waveguides of an arrayed waveguide grating, and a dispersion-compensating module employing the dispersion compensator.

6 Claims, 2 Drawing Sheets

DISPERSION COMPENSATOR AND DISPERSION-COMPENSATING MODULE EMPLOYING THE SAME

BACKGROUND OF THE INVENTION

1. Field of the Invention

The present invention relates to a dispersion compensator and a dispersion-compensating module employing the dispersion compensator.

2. Description of Related Art

For high-speed and large-capacity optical communications, a dispersion compensation technique is inevitably required to reduce degradation in transmission caused by dispersion accumulated over the optical fiber transmission line. Typically, such a dispersion compensation technique employs dispersion compensating fibers.

Incidentally, it is necessary to compensate for different amounts of dispersion according to wavelength in wavelength division multiplexing communications in which a plurality of different wavelengths of light are multiplexed. This presented such a problem that dispersion compensation in the optical communication system required a dispersion-compensating fiber of length several to tens of kilometers for each wavelength, thereby increasing the size of the system.

In this case, it is conceivable to provide, on an optical transmission path for each wavelength, a dispersion-compensating module comprising a circulator and a fiber Bragg grating (FBG), yet narrow in bandwidth, for compensating for dispersion. However, this method has a drawback that an increase in number of wavelengths will correspondingly increase the number of dispersion-compensating modules, leading to an increase in cost for dispersion compensation since the circulator is expensive. In addition, there was another problem that it was necessary to connect an optical transmission path to each of said circulators for each wavelength in the dispersion-compensating module, which makes the connection complicated.

SUMMARY OF THE INVENTION

An object of the present invention is to provide a dispersion compensator which can be used for dispersion compensation in a wavelength division multiplexing communication system and which can make the optical communication system less in size than does the conventional dispersion compensation fiber. Another object of the present invention is to provide a dispersion-compensating module which facilitates the connection to the component parts.

To achieve the aforementioned objects, the dispersion compensator according to the present invention employs an arrayed waveguide grating comprising at least one input waveguide, a first slab waveguide, an arrayed waveguide having a plurality of channel waveguides, a second slab waveguide, and a plurality of output waveguides are formed on a substrate. The dispersion compensator is configured such that Bragg gratings, each having a dispersion compensating function, are formed on the plurality of output waveguides of the arrayed waveguide grating.

Furthermore, to achieve the aforementioned objects, the dispersion compensator according to the present invention is configured such that planar waveguides provided with a predetermined number of Bragg gratings having a dispersion compensating function are connected to output waveguides of an arrayed waveguide grating.

The planar waveguides are preferably a plurality of waveguides formed on a substrate.

Moreover, the substrate is preferably formed of silicon or glass.

Furthermore, to achieve the aforementioned objects, the dispersion-compensating module according to the present invention comprises a circulator having an input port, an output port, and a connecting port. The dispersion-compensating module also comprises aforesaid dispersion compensator connected to the connecting port of the circulator, and an optical demultiplexer comprising an arrayed waveguide grating connected to the output port of the circulator.

According to the present invention, it is made possible to provide a dispersion compensator which can be used for dispersion compensation in a wavelength division multiplexing communication system and which can make the optical communication system less in size than does the conventional dispersion compensation fiber. It is also made possible to provide a dispersion-compensating module which facilitates the connection to the component parts.

These and other objects, features and advantages of the present invention will become clear from the following detailed description with reference to the accompanying drawings.

DETAILED DESCRIPTION

Figure 1:
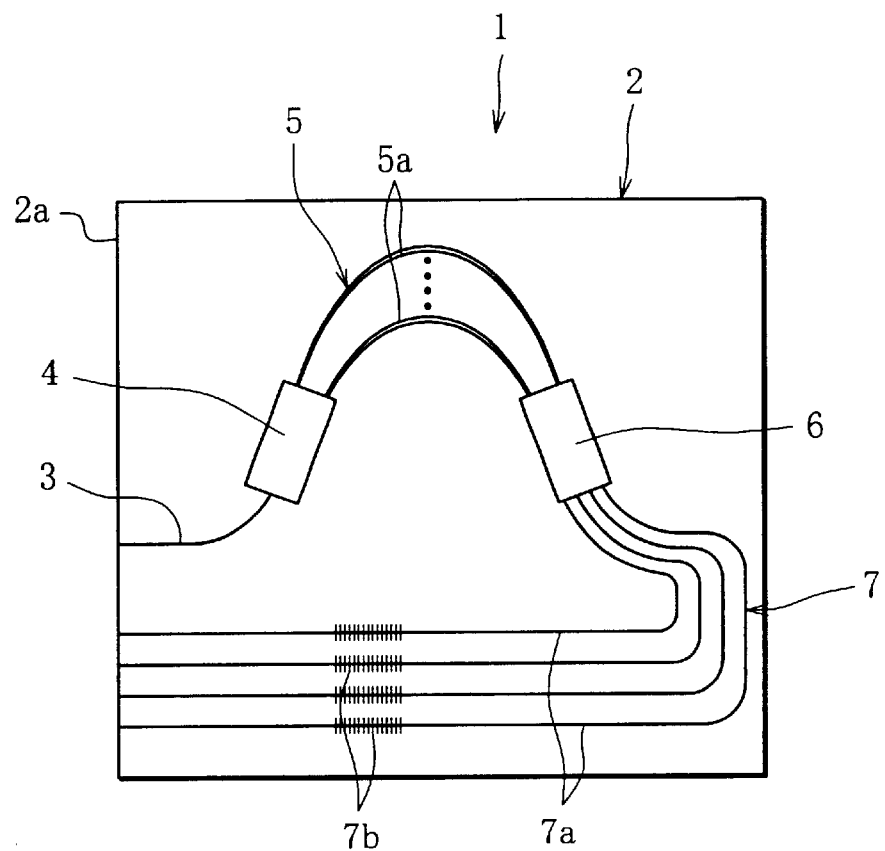
FIG. 1 is a schematic plan view illustrating the configuration of a dispersion compensator according to an embodiment of the present invention.

Now, an embodiment of a dispersion compensator and a dispersion-compensating module employing the dispersion compensator according to the present invention will be described below with reference to FIGS. 1 to 3.

A dispersion compensator 1 employs an arrayed waveguide grating (AWG). As shown in FIG. 1, at least one input waveguide 3 arranged side by side, a first slab waveguide 4, an arrayed waveguide 5 comprising a plurality of channel waveguides 5a that is arranged side by side, a second slab waveguide 6, and a plurality of output waveguides 7 arranged side by side are formed on a substrate 2 that is made of silicon, glass or the like.

At least one input waveguide 3 is connected to, for example, transmission side optical fibers (not shown), light having undergone the wavelength division multiplexing is introduced to at least one input waveguide, at one end surface 2a so that the light output from at least one input waveguide 3 is introduced to the first slab waveguide 4.

The first slab waveguide 4 propagates the wavelength-multiplexed light that is output from at least one input waveguide 3. The light, having been introduced to the first slab waveguide 4, is diffracted by the diffraction effect thereof and enters the arrayed waveguide 5 to travel along the arrayed waveguide 5.

Having traveled through the arrayed waveguide 5, the light reaches the second slab waveguide 6 to be output therefrom. Because of the preset difference in length between adjacent channel waveguides 5a of the arrayed waveguide 5, light beams after traveling through the arrayed waveguide 5 have different phases from one another. The wavefront of many light beams from the arrayed waveguide 5 is tilted in accordance with the differences and the position where the light is condensed is determined by the angle of this tilt.

Therefore, light beams having different wavelengths are condensed at different positions from one another. By forming the plurality of output waveguides 7 at these positions, light beams $\lambda_1, \lambda_2 \ldots \lambda_n$ having different wavelengths can be output from the respective plurality of output waveguides 7 provided for the respective waveguides.

The plurality of output waveguides 7 have one end exposed to the end surface 2a and the other end connected to the second slab waveguide 6. In addition, there are formed straight portions 7a on the way extending from the second slab waveguide 6 to the end surface 2a. The straight portions 7a each have a Bragg grating 7b which has a dispersion compensation function. The embodiment of FIG. 1 shows the four output waveguides 7 but the present invention is not limited thereto, and it has significant number of waveguides in practice.

The dispersion compensator 1 is configured as described above, in which the wavelength-multiplexed light introduced from one of at least one input waveguide 3 is output into the different output waveguides 7 according to its wavelength. Here, the output waveguides 7 each have the Bragg grating 7b which has the dispersion compensation function. In this context, the light, which are demultiplexed according to their wavelengths and output into the different output waveguides 7, are reflected off each of the Bragg gratings 7b and dispersion compensated. Then, the light pass through the same path in reverse fashion to be multiplexed and are then output from one of at least one input waveguide 3 as wavelength-multiplexed light.

At this time, in each of the Bragg gratings 7b, a period $\Lambda(x)$ is set in the longitudinal direction of the output waveguides 7 as follows.

$$\Lambda(x)=\Lambda 0+\alpha \cdot x \tag{1}$$

where x is the position measured from the input end of the Bragg gratings 7b, $\Lambda 0$ is the grating period at the position of x=0, and $\alpha$ is the rate of chirping of the grating period.

Then a center wavelength of refraction $\lambda(x)$ at the position of x in the Bragg gratings 7b is given by $$\lambda(x)=2neff\cdot\Lambda(x)=2neff(\Lambda 0+\alpha \cdot x) \tag{2}$$

Furthermore, where "neff" is the effective refractive index, and the time required for the light incident upon the Bragg gratings 7b to be reflected off the position x and return to the position of the incidence, that is, the delay time $\tau(x)$ is given by $$\tau(x)=2neff\cdot x/c \tag{3}$$

where c is the velocity of light.

Therefore, from equations (2) and (3), the delay time $\tau(x)$ is given, using the center wavelength of refraction $\lambda(x)$, by $$\tau(x)=\{\lambda(x)-2neff\cdot\Lambda 0\}/(\alpha \cdot c) \tag{4}$$

The wavelength dispersion D is calculated by differentiating by $\lambda$ the equation (4).

$$D=\partial\tau/\partial\lambda=1/(\alpha \cdot c) \tag{5}$$

As is evident from equation (5), the wavelength dispersion D is determined only by the chirping rate $\alpha$ of the grating period.

Therefore, predetermined design of the chirping rate $\alpha$ of the Bragg gratings 7b will allow the dispersion compensator 1 to compensate for wavelength dispersion according to wavelength.

Furthermore, an efficient width of compensation Bw at a wavelength can be determined by the difference between the center wavelength of refraction at both ends of the Bragg gratings 7b. Thus, letting the length of the Bragg gratings 7b be 1, the compensation bandwidth Bw is given from equation (2) by $$Bw=2neff\cdot\alpha\cdot l \tag{6}$$

EXAMPLES

The arrayed waveguide grating type optical multiplexer/demultiplexer according to the embodiments is an arrayed waveguide grating type optical multiplexer/demultiplexer that is capable of multiplexing and demultiplexing light corresponding to, e.g., sixteen waves with a frequency interval of 100 GHz, and has the following parameters. The parameters include FSR (Free Spectral Range) set to 26 nm, the difference $\Delta L$ in length between adjacent channel waveguides 5a set to 63.1 $\mu$m, and a diffraction order m set to 59.

The parameters also include a relative refractive index difference $\Delta$ set to 0.8% for the plurality of output waveguides 7, a dimension of the plurality of output waveguides 7 set to 6.5×6.5 $\mu$m, and a core pitch of the plurality of output waveguides 7 set to 250 $\mu$m.

Then, in the same manner as the fabrication of the fiber grating, the prepared AWG was treated with hydrogen in a high-pressure vessel for several days. Thereafter, the Bragg gratings 7b comprising chirped gratings were formed by a phase mask method over a length of 6 cm in the longitudinal direction of the plurality of output waveguides 7 in the AWG treated with hydrogen.

Here, the Bragg gratings 7b are provided with a chirping rate $\alpha$=0.1 nm/cm and a compensation bandwidth of 0.87 nm so as to be able to cover an 1 dB bandwidth of about 0.3 to 0.5 nm of an AWG of a flat pass band type. Therefore, from equation (5), the amount of dispersion compensation is determined to be a constant value, that is 670 ps/nm independent of the wavelength of light.

In addition, the pitch $P_{CT}$ between the centers of the Bragg gratings 7b was determined by the following equation in accordance with the center wavelength of refraction $\lambda(x)$ and the effective refractive index neff (=1.451). That is, $$P_{CT}=\lambda(x)/2/neff$$

In this example, dispersion was designed to be constant, however, a desired amount of dispersion can be compensated by designing of the chirping rate $\alpha$.

Then, the AWG was dehydrogenated and thereafter aged at a temperature of 250° C. for five minutes to form the dispersion compensator 1.

The dispersion compensator 1 manufactured in the manner described above was placed on a heat sink (a Peltier device or the like). A wavelength-multiplexed light is input from one of at least one input waveguide 3 and then reflected off the Bragg gratings 7b of the plurality of output waveguides 7 to be dispersion compensated. Thereafter, the loss of the wavelength-multiplexed light output from one of at least one input waveguide 3 was measured. The measurement showed that the dispersion compensator 1 provided a loss less by about 1 dB than did a dispersion compensator connected with a fiber Bragg grating. This is caused by the dispersion compensator 1 which employs both input and output light and the Bragg gratings 7b which are directly formed on the plurality of output waveguides 7.

In addition, it was found that the dispersion compensator 1 had a dispersion of 650 ps/nm after having been subtracted by the dispersion at the arrayed waveguides 5.

Now, a dispersion-compensating module employing the dispersion compensator 1 will be explained with reference to FIG. 2.

The dispersion-compensating module 10 comprises the dispersion compensator 1, a circulator 11, and an optical demultiplexer 12.

The circulator 11 comprises an input port 11a, an output port 11b, and a connection port 11c. The input port 11a is connected with an input fiber 13, the output port 11b is connected with the optical demultiplexer 12 through an optical fiber 14, and the connection port 11c is connected with the dispersion compensator 1 through an optical fiber 15, respectively. Here, the optical fiber 15 is connected to one of at least one input waveguide 3 (not shown in FIG. 2) of the dispersion compensator 1.

The optical demultiplexer 12 is an optical multiplexer/demultiplexer of the arrayed waveguide grating type and comprises a plurality of output waveguides 12a.

Thus, in the dispersion-compensating module 10, the wavelength-multiplexed light transmitted along the input fiber 13 is input to the circulator 11 from the input port 11a to be incident upon the dispersion compensator 1 from the connection port 11c.

The wavelength-multiplexed light incident upon the dispersion compensator 1 is transmitted from one of at least one input waveguide 3 through the first slab waveguide 4 and then the arrayed waveguide 5 to the second slab waveguide 6. The light are then output to the different output waveguides 7 according to its wavelength. Then, the light demultiplexed according to their wavelength and output to the different output waveguides 7 are reflected off each of the Bragg gratings 7b and dispersion compensated at the same time. The beams of light then pass through the same paths in reverse fashion to be multiplexed into a beam of light, which is then output from one of at least one input waveguide 3 as wavelength-multiplexed light to the optical fiber 15.

Then, the wavelength-multiplexed light output to the optical fiber 15 is transmitted from the connection port 11c to the output port 11b and then is incident on the optical demultiplexer 12 through the optical fiber 14.

The wavelength-multiplexed light incident upon the optical demultiplexer 12 is demultiplexed into beams of light according to their wavelength to be output to the different output waveguides 12a.

As described above, in the dispersion-compensating module 10, the wavelength-multiplexed light comprising a plurality of wavelengths and compensated for dispersion in the dispersion compensator 1 is demultiplexed in the optical demultiplexer 12 and then output.

As described in the foregoing, in the dispersion compensator 1, the Bragg gratings 7b, each of which has a dispersion compensating function, are provided on each of the plural output waveguides 7 of the arrayed waveguide grating. Accordingly, the use of the dispersion compensator 1 and the dispersion-compensating module 10 employing the dispersion compensator 1 for dispersion compensation in a wavelength division multiplexing communication system makes it possible to reduce the size of the optical communication system. In addition, the dispersion compensator 1 has the Bragg gratings 7b, each of which has a dispersion compensating function, integrated with the plurality of output waveguides 7, respectively, thereby requiring only one heat sink (a Peltier device or the like) for controlling the temperature of the dispersion compensator 1. Furthermore, the dispersion-compensating module 10 has such a simple configuration that comprises only the dispersion compensator 1, the circulator 11, and the optical demultiplexer 12, thereby facilitating the connection to the component parts.

Figure 3:
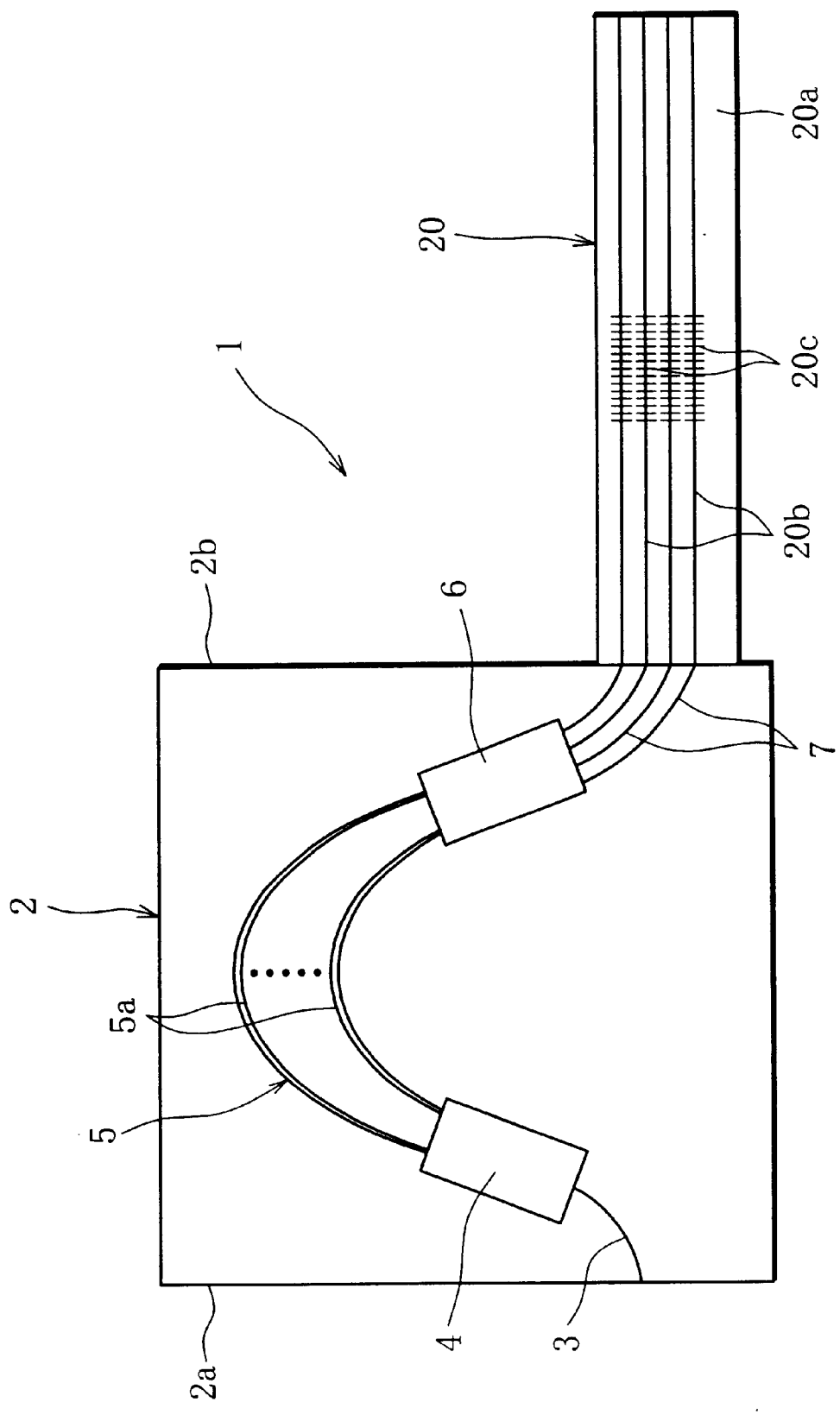
FIG. 3 is a schematic plan view illustrating the configuration of a dispersion compensator according to another embodiment of the present invention.

The dispersion compensator according to the present invention may be configured as the dispersion compensator 1 shown in FIG. 3. That is, the straight portions 7a and the Bragg gratings 7b may not be formed on the plurality of output waveguides 7, and a waveguide grating 20 may be connected with the output end of the output waveguides 7 exposed to the other end surface 2b. Here, the dispersion compensator 1 is not repeatedly explained, in which the same components as those of the dispersion compensator 1 of FIG. 1 are given the same reference symbols.

Here, the waveguide substrate 20 comprises a plurality of waveguides 20b formed on a substrate 20a of silicon, glass or the like, and is provided on each of the waveguides 20b with a Bragg grating 20c.

The dispersion compensator 1 can also be configured as shown in FIG. 3, thereby providing the same effect as does the dispersion compensator 1 shown in FIG. 1.

Figure 2:
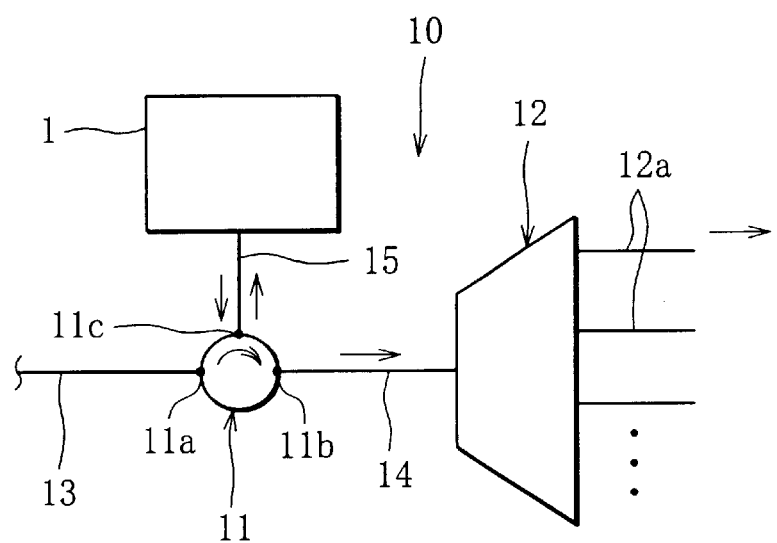
FIG. 2 is a schematic view illustrating the configuration of a dispersion-compensating module according to the present invention, which employs the dispersion compensator of FIG. 1.

Like the dispersion-compensating module 10 shown in FIG. 2, the dispersion compensator 1 configured as shown in FIG. 3 can be used in a dispersion-compensating module. This is accomplished by connecting the dispersion compensator 1 configured as shown in FIG. 3 to the connection port 11c of the circulator 11 through the optical fiber 15.

What is claimed is:

1. A dispersion compensator employing an arrayed waveguide grating comprising:

at least one input waveguide receiving a wavelength division multiplexed signal, a first slab waveguide optically linked to the at least one input waveguide and configured to diffract the wavelength division multiplexed signal, an arrayed waveguide optically linked to the first slab waveguide and having a plurality of channel waveguides for propagating the wavelength division multiplexed signal therealong, a second slab waveguide optically linked to the arrayed waveguide and configured to focus signals having wavelengths different from one another, a plurality of output waveguides formed on a substrate for receiving a corresponding one of the signals having wavelengths different from one another, and a plurality of Bragg gratings optically linked to a respective one of the plurality of output waveguides, each having a dispersion compensating function.

2. The dispersion compensator according to claim 1, wherein said substrate is formed of silicon or glass.

3. The dispersion compensator of claim 1 wherein planar waveguides are provided with a predetermined number of Bragg gratings each having a dispersion compensating function and connected to output waveguides of an arrayed waveguide grating.

4. The dispersion compensator according to claim 3, wherein said planar waveguides are a plurality of waveguides formed on a substrate.

5. The dispersion compensator according to claim 4, wherein said substrate is formed of silicon or glass.

6. A dispersion-compensating system comprising:

a circulator having an input port, an output port, and a connecting port, the dispersion compensator, according to claim 1 or 3, connected to the connecting port of said circulator, and an optical demultiplexer comprising the arrayed waveguide grating connected to the output port of said circulator.

* * * * *